Feb. 20, 1934.   F. B. WILLIAMSON, JR   1,948,410
HOSE
Filed June 13, 1931
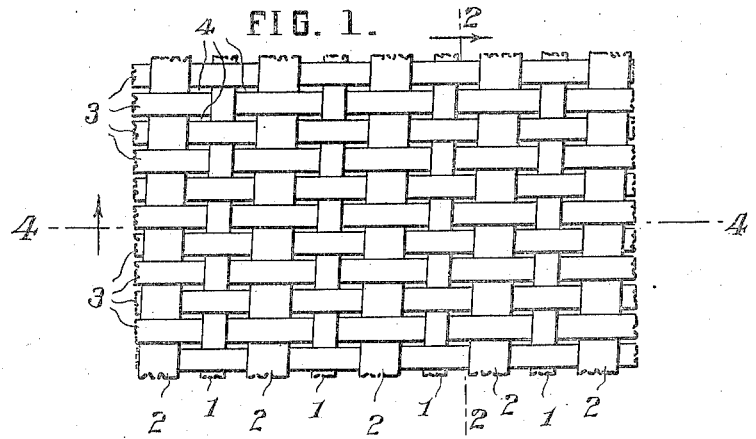
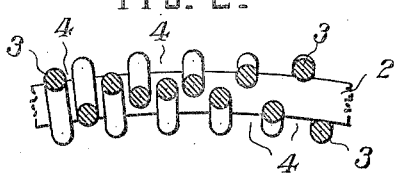
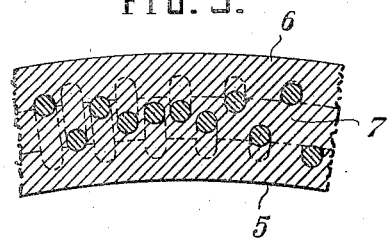
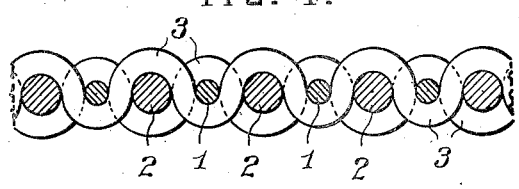
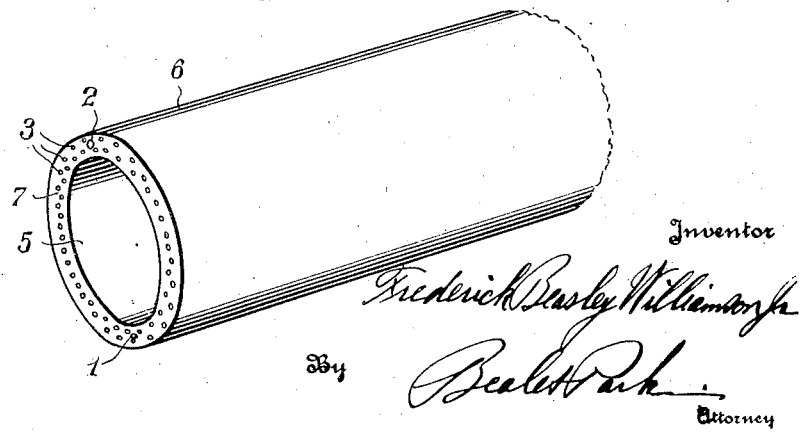
Inventor
Frederick Beasley Williamson Jr
By Bealet Park
Attorney Patented Feb. 20, 1934

1,948,410

UNITED STATES PATENT OFFICE 1,948,410

HOSE

Frederick Beasley Williamson, Jr., Elizabeth, N. J., assignor to The Whitehead Bros. Rubber Co., Trenton, N. J., a corporation of New Jersey Application June 13, 1931. Serial No. 544,257

2 Claims. (Cl. 137—90)

My invention consists in a new and useful improvement in hose, and is designed to provide a hose which may be used for both pressure and suction purposes, which is to say that my improved hose may be used as a conduit for fluids under pressure in which uses it is adapted to withstand heavy pressure from within exerted outwardly, and it may be used also as a suction hose in which uses it is adapted to withstand pressure from without exerted inwardly. The pressure resisting element of my hose is a woven fabric wall in which the strength element is secured by the spiral arrangement of resilient wire of sufficient resistance quality to resist such pressures as may be exerted on either side of this wall, in any uses for which my hose is designed to be used, which wire is incorporated in the wall. Within this wall, I provide a lining of rubber or other suitable material.

I am aware that it is known practice to make pressure hose with a resistance wall and a lining of rubber. However, such a pressure hose cannot be used as a suction hose, since the atmospheric pressure exerted through the fabric wall by reason of the penetration of air through the fabric will cause the collapse of the inner rubber lining. In other words, in the ordinary form of pressure hose, the pressure wall affords protection against pressure in only one direction, viz. outward pressure. In my improved hose, I provide an outer covering, for the resistant wall, of rubber or other air impervious material.

I am aware that it is known practice to make suction hose with a resistance wall with a rubber cover. However, such suction hose cannot be used as a pressure hose, since the outer rubber cover, though preventing air from passing through the resistant wall when the hose is used for suction, will expand away from the resistant wall, if the hose is used as a pressure hose, since the fluid under pressure passes through the resistance wall and expands the outer rubber cover. When this happens, the resistance wall, being separated from its rubber cover, is liable to displacement injuring the hose.

But by providing the inner rubber lining I prevent the passage of the fluid under pressure through the resistance wall, and thus avoid any expansion of the outer rubber wall.

A very important feature of my invention is the improved process by which I relate the resistance wall and the inner and outer rubber walls. I fabricate my resistance wall in such a manner that interstices are afforded therein, and in the application of the rubber walls to the resistance wall, the rubber penetrates these interstices. The result is to form a substantially homogeneous product in which the fabric is incorporated in the rubber.

While I have illustrated in the drawing filed herewith and hereinafter fully described one specific embodiment of my invention, it is to be distinctly understood that I do not consider my invention limited to said specific embodiment but refer for its scope to the claims appended hereto.

In the drawing:

Fig. 1 is a front elevation of a fragment of the woven resistance wall.

Fig. 2 is a section on the line 2—2 of Fig. 1.

Fig. 3 is a view similar to Fig. 2 but showing a portion of the resistance wall in the rubber.

Fig. 4 is a section on the line 4—4 of Fig. 1.

Fig. 5 is a perspective view of a portion of my improved hose.

As clearly indicated in Fig. 1, the resistance wall is composed of the two spiral woof threads 1 and 2, of cotton and resilient wire respectively, and the cotton warp threads 3. It is to be especially noted that the weave of this fabric is such that there are provided interstices 4 between the woof threads 1 and 2 and the warp threads 3. It is obvious from Fig. 3 that when the inner wall 5 of rubber is applied to the resistance wall the rubber will penetrate through the interstices 4 and pass to the outside of the resistance wall. Then the outer wall 6 or rubber is applied with the result, as indicated at 7 in Fig. 5, that the resistance wall is embedded in the rubber of the inner and outer walls 5 and 6, thus forming a homogeneous product.

My improved process of producing the hereinbefore described novel form of hose consist in the following steps: The first step is the weaving of the resistance wall composed of the woof threads 1 and 2 and the warp threads 3 so as to form a loose or open weave. When I have woven a given length of this tubular wall, it is normally contracted by the action of the helical woof thread 2 composed of the resilient wire. The next step consists in so twisting the length of wall as to overcome this contraction and thus cause the expansion of the weave to form the open interstices 4. The length of wall is then held in this position. The next step consists in applying, to the inner face of this wall, the inner wall 5 of rubber in such condition of plasticity that it permeates the resistance wall through the interstices 4. After this wall 5 have been applied, the product is released and by the action of the wire 2 is caused to slightly contract. This contraction serves to partially extrude the portions of the wall 5 in the interstices 4, forming points of rubber upon the outside of the resistance wall. The next step in my process consists in applying the outer wall 6 of rubber which coalesces with the portions of rubber of the wall 5 which have passed through the resistance wall.

Having described my invention, what I claim is:

1. A hose having a core consisting of warp and weft threads and a helical resilient wire incorporated therein, said wire and said warp threads and said weft threads having interstices between them; an inner lining of rubber material applied to said core while the interstices are expanded by the untwisting of the helical wire; an outer coating of rubber material; and particles of rubber material filling said interstices and connecting said lining and said coating into a homogeneous mass and clamped in said interstices by the tendency of said helical wire to return to its normal condition.

2. A hose comprising in combination, a body of rubber-like material, and a fabric embedded in said body and comprising warp and weft threads of fabric and a helical resilient coil of wire, forming interstices between them, portions of said body of rubber-like material having been passed through said interstices in said fabric while said coil is deformed by untwisting, and subjected to the pressure of said coil due to its tendency to return to its normal condition.

FREDERICK BEASLEY WILLIAMSON, Jr.